(54) VARIABLE THRESHOLD MOTOR COMMUTATION PULSE DETECTION CIRCUIT

(75) Inventors: Kenneth George Draves, Russiaville; Paul M. Werking, Tipton, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/346,365

(22) Filed: Jul. 1, 1999

(51) Int. Cl.[7] ............................. H02P 6/08; H02P 7/00; H02P 7/06
(52) U.S. Cl. .................. 318/293; 318/254; 318/608; 388/907.2; 388/907.5
(58) Field of Search .................. 318/254, 258, 318/261, 294, 603, 293, 608; 388/907.2, 907.5, 909

(56) References Cited

U.S. PATENT DOCUMENTS

| | | | |
|---|---|---|---|
| 5,045,766 | * | 9/1991 | Vermersch .......................... 318/293 |
| 5,132,602 | * | 7/1992 | Jorgensen et al. .................. 318/608 |
| 5,514,977 | * | 5/1996 | Agiman ............................... 318/254 |
| 5,574,344 | * | 11/1996 | Matsuoka et al. .................. 318/293 |
| 5,796,231 | * | 8/1998 | Kyodo ................................. 318/608 |
| 5,798,624 | * | 8/1998 | Wilke et al. ........................ 318/254 |
| 5,986,427 | * | 11/1999 | Tranquilla .......................... 318/623 |
| 6,078,154 | * | 6/2000 | Manlove et al. .................... 318/293 |

* cited by examiner

*Primary Examiner*—Paul Ip
(74) *Attorney, Agent, or Firm*—Jimmy L. Funke

(57) ABSTRACT

An improved motor commutation pulse detection circuit for comparing a filtered motor current signal to a threshold value, where the circuit is responsive to the actual or expected amplitude of the commutation pulses for adjusting the motor current signal or the threshold value so that the compared threshold value is substantially equal in amplitude to minimum amplitude commutation pulses in the compared motor current signal. In one circuit, the threshold value is varied in accordance with the average current flowing through the motor at the time of the commutation event. In another circuit, the threshold is effectively switched between a high value and a low value depending on the mode of operation of the motor. A motor run detection threshold is activated during motor running periods, while a motor brake detection threshold is activated during motor braking. The run time detection threshold is set to a relatively high value to detect the relatively high amplitude commutation pulses that occur during motor running, while the brake detection threshold is set to a relatively low value to detect the relatively low amplitude commutation pulses that occur during motor braking. The threshold can effectively be changed by attenuating the commutation signal by a predetermined factor during motor run periods.

15 Claims, 2 Drawing Sheets

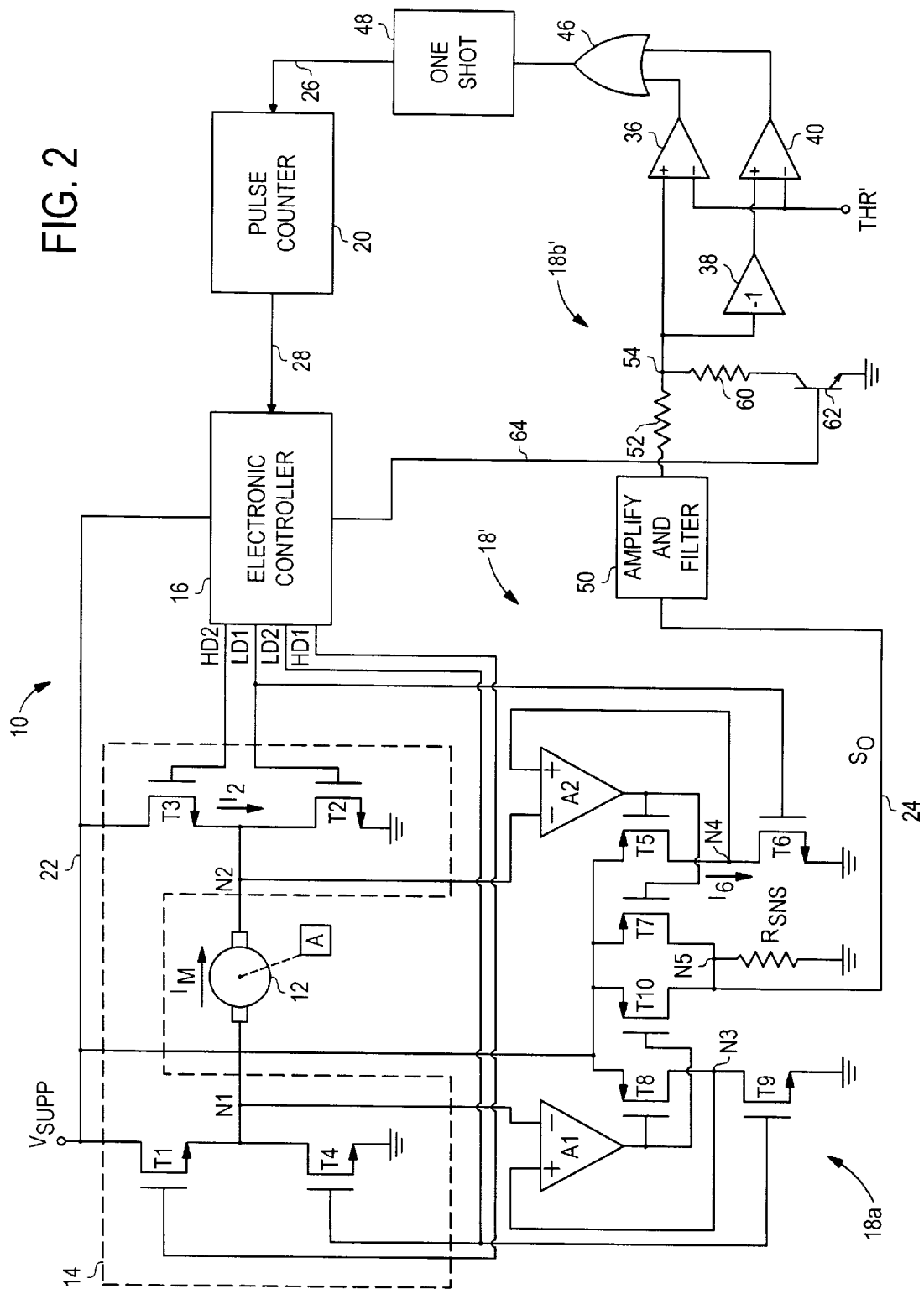

US 6,262,546 B1

VARIABLE THRESHOLD MOTOR COMMUTATION PULSE DETECTION CIRCUIT

TECHNICAL FIELD

This invention relates to circuitry for determining the position of a motor driven actuator by identifying and counting motor commutation pulses.

BACKGROUND OF THE INVENTION

It is frequently desired, either for control or diagnostic purposes, to detect the position of a motor driven actuator, such as a movable door in an automotive air conditioning duct. In applications where the actuator is driven by a brush-type DC motor, the actuator position may be reliably and inexpensively determined by detecting and counting pulses in the motor current caused by the periodic commutation of motor current by the motor brushes. In general, the pulses are extracted by filtering, and compared to a threshold to distinguish commutation pulses from noise pulses. When a commutation pulse is detected, a one shot is triggered to produce a logic level pulse, and the one shot pulses are counted to provide an output corresponding to the actuator position.

Several different pulse detection circuits have been proposed. In one such circuit, described in U.S. Pat. No. 5,132,602, a resistive shunt is connected in a ground path of the motor drive circuit, and the voltage across the shunt is capacitively coupled to the filter circuit. In another circuit, described in U.S. Pat. No. 5,514,977, a resistive shunt is connected in series with the motor, and the voltage at a node between the motor and shunt is capacitively coupled to the filter circuit. In still another circuit, described in co-pending U.S. patent application Ser. No. 09/249,339, filed Feb. 12, 1999, a high impedance circuit connected across the motor controls the current in a sense resistor in proportion to the motor current, and the sense resistor voltage is provided as an input to the filter circuit. Alternatively, the motor voltage itself may be capacitively coupled to the filter circuit, as also described in the co-pending U.S. patent application Ser. No. 09/249,339.

A problem experienced in each of the above-described circuits concerns reliably distinguishing commutation pulses from noise pulses. The problem occurs particularly with those circuits which are designed to detect commutation pulses both during motor running and motor braking or coasting, because the pulse amplitudes are much higher during running than during braking or coasting. For example, the commutation pulse amplitude during motor running may be 50 mV or more, while the amplitude during motor braking or coasting may be as small as 14 mV. To detect all commutation pulses, the comparator circuitry is generally designed with a detection threshold slightly lower than the smallest expected pulse, say 12 mV. However, the susceptibility to noise increases as the detection threshold decreases, resulting in an increased likelihood of erroneous pulse detection. What is needed is a simple detection circuit that is insensitive to noise pulses, but will reliably detect all commutation pulses.

SUMMARY OF THE INVENTION

The present invention is directed to an improved motor commutation pulse detection circuit for comparing a filtered motor current signal to a threshold value, where the circuit is responsive to the actual or expected amplitude of the commutation pulses for adjusting the motor current signal or the threshold value so that the compared threshold value is substantially equal in amplitude to minimum amplitude commutation pulses in the compared motor current signal. In this way, all of the commutation pulses can be reliably detected, and the likelihood of mistaking a noise pulse for a commutation pulse is dramatically reduced.

According to a first embodiment, the threshold is varied in accordance with the average current flowing through the motor at the time of the commutation event. In the illustrated embodiment, this is achieved by filtering out the low frequency component of the commutation signal, summing it with a minimum threshold value, and applying a gain factor to the sum to form the variable threshold with which the high frequency component of the commutation signal is compared.

According to a second embodiment, the threshold is effectively switched between a high value and a low value depending on the mode of operation of the motor. A run time detection threshold is activated during motor running periods, while a brake/coast detection threshold is activated during motor braking and coasting. The run time detection threshold is set to a relatively high value to detect the relatively high amplitude commutation pulses that occur during motor running, while the brake/coast detection threshold is set to a relatively low value to detect the relatively low amplitude commutation pulses that occur during motor braking and coasting. In the illustrated embodiment, this is achieved with a single comparator and an attenuation circuit that attenuates the commutation signal by a predetermined factor during motor running periods.

BRIEF DESCRIPTION OF THE DRAWINGS

FIG. 2 is a circuit diagram of a second embodiment of the variable threshold motor commutation pulse detection circuit of this invention.

DESCRIPTION OF THE PREFERRED EMBODIMENT

Figure 1:
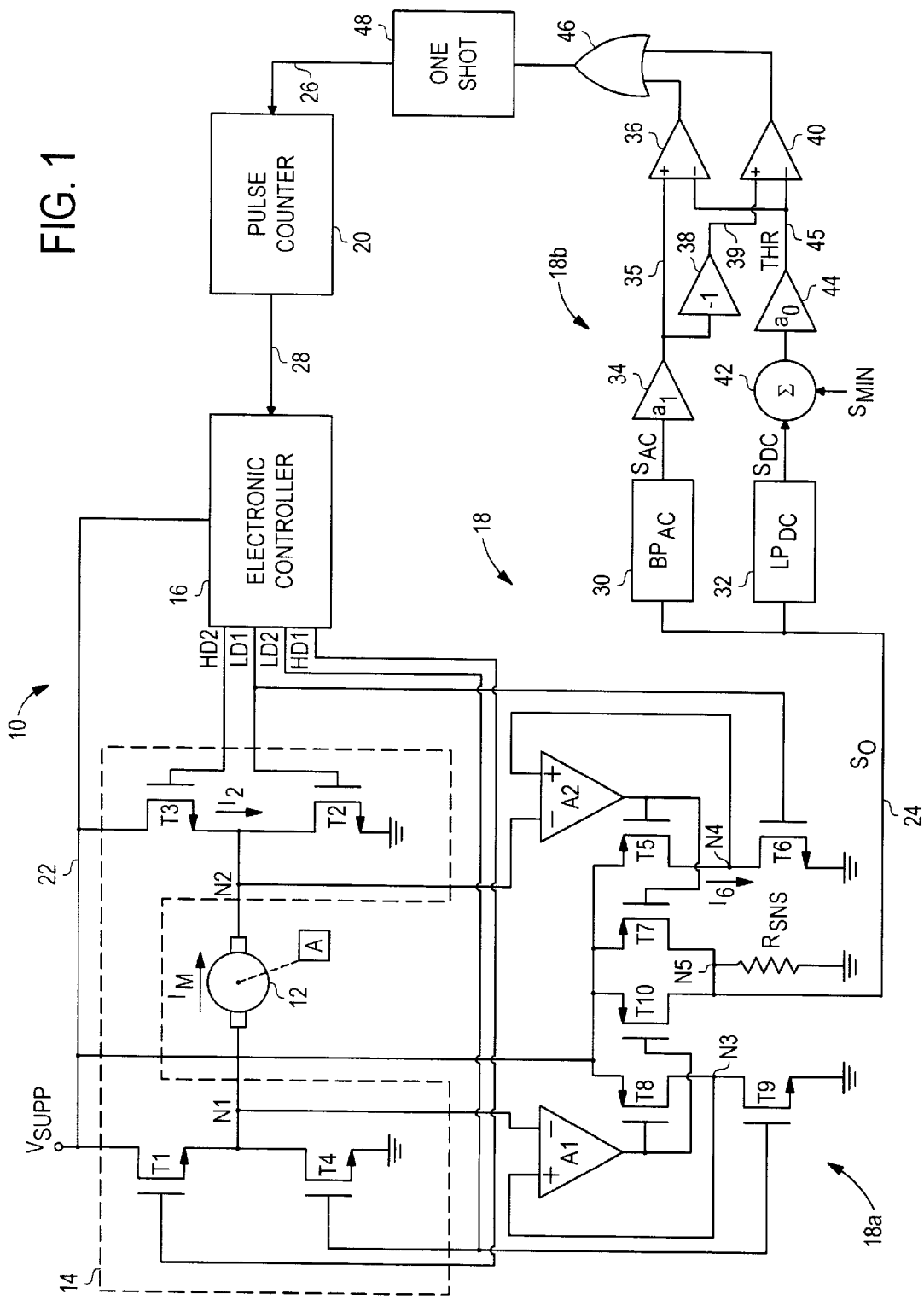
FIG. 1 is a circuit diagram of a first embodiment of the variable threshold motor commutation pulse detection circuit of this invention.

In FIG. 1, the reference numeral 10 generally designates a motor control system including a motor 12, a drive circuit 14, an electronic controller 16, a commutation pulse detection circuit 18, and a pulse count circuit 20. The motor 12 is a brush-type DC motor, the drive circuit 14 includes four transistors T1, T2, T3, T4 connected in an H-bridge configuration to bi-directionally energize the motor windings with a current $I_M$ from a DC power supply (not shown) coupled between supply line 22 ($V_{SUPP}$) and ground. The motor 10 may be coupled to drive an actuator A, and the controller 16 produces drive signals HD1, LD1, HD2, LD2 for the bridge transistors T1–T4 to move the actuator A to a commanded position. The commutation pulse detection circuit 18 includes a motor current circuit 18a and a pulse detection circuit 18b. The motor current circuit 18a produces a motor current signal $S_O$ on line 24 corresponding to the absolute value of the motor current $I_M$, and the pulse detection circuit produces a pulse of uniform duration on line 26 for each commutation pulse detected in the signal $S_O$. The line 26, in turn, is supplied as an input to the pulse count circuit 20, which provides a digital feedback signal to controller 16 on line 28. The feedback signal on line 28 corresponds to the actual motor position, and the controller 16 compares the actual and commanded motor positions to form a closed-loop error signal for activating the transistors T1–T4 to drive the motor 10 to the commanded position.

The motor current circuit 18a includes a pair of operational amplifiers A1 and A2 coupled to opposing terminals or nodes N1 and N2 of motor 10, a current mirror circuit comprising the p-channel MOS transistors T5, T7, T8, T10 and the n-channel MOS transistors T6, T9 coupled to the outputs of amplifiers A1–A2, and a sense resistor $R_{SNS}$. Specifically, the inverting input of amplifier A1 is connected to node N1, and the inverting input of amplifier A2 is connected to node N2. The non-inverting input of amplifier A1 is connected to a node N3 between serially connected transistors T8 and T9, and the non-inverting input of amplifier A2 is connected to a node N4 between serially connected transistors T5 and T6. The serially connected transistors T8, T9 and T5, T6 are coupled between supply line 22 and ground, whereas the transistors T7 and T10 couple the supply line 22 to the upper terminal, or node, N5 of sense resistor $R_{SNS}$, the opposite terminal of $R_{SNS}$ being coupled to ground. The gate of transistor T9 is coupled to the controller drive signal LD2 for bridge transistor T4, while the gate of transistor T6 is coupled to the drive signal LD1 for bridge transistor T2. Finally, the gates of transistors T8, T10 are coupled to the output of amplifier A1, and the gates of transistors T5, T7 are coupled to the output of amplifier A2.

The amplifier A1 and transistor 18 force the voltage at node N3 to follow the voltage at motor node N1, and the amplifier A2 and transistor T5 force the voltage at node N4 to follow the voltage at motor node N2. However, the transistors T6, T9 have reduced channel widths W6, W9 compared with the widths W2, W4 of bridge transistors T2, T4, so that the currents I6, I9 flowing through transistors T6, T9 are related to the currents I2, I4 flowing through bridge transistors T2, T4 as follows: I6=(W6/W2)*I2, and I9=(W9/W4)*I4. Furthermore, the transistors T5, T7 and T8, T10 are matched so that the currents I6, I9 are mirrored in the transistors T7, T10. When the motor current IM has a direction as indicated in FIG. 1, transistors T8, T10 are cut off, and the amplifier A2 and transistors T5, T6, T7 produce a voltage $S_0$ across $R_{SNS}$ of (W6/W2)*I2*$R_{SNS}$. Likewise, when the motor current IM has a direction opposite to that indicated in FIG. 1, transistors T5, T7 are cut off, and the amplifier A1 and transistors T8, T9, T10 produce a voltage $S_0$ across $R_{SNS}$ of (W9/W4)*I4*$R_{SNS}$. In other words, the voltage $S_0$ across $R_{SNS}$ has an absolute value that is proportional to the motor current $I_M$.

As indicated above, the function of the pulse detection circuit 18b is to identify commutation pulses in the motor current signal SO. In general, this is done by filtering and amplifying the signal $S_0$, and comparing it to a threshold, as described in the aforementioned patents and patent application. However, the present invention is particularly directed to a pulse detection circuit 18b having a variable threshold for reliably identifying motor commutation pulses with minimum susceptibility to noise in the motor current signal $S_0$.

In the embodiment of FIG. 1, the motor current signal $S_0$ is supplied as an input to each of the filters 30 and 32. The band-pass filter 30 passes components of the motor current signal $S_0$ in the frequency range of commutation pulses, producing a high frequency, or AC, motor current signal $S_{AC}$. The bandwidth of filter 30 is highly dependent on the motor and its application, but typically is designed to pass signal components in the range of 20 kHz to 50 kHz. On the other hand, the low-pass filter 32 passes components of the motor current signal So in a relatively low frequency range, producing a low frequency, or DC, motor current signal $S_{DC}$; in the illustrated embodiment, the filter 32 passes signal components in the range of 0 Hz to 2 kHz. Thus, the signal $S_{AC}$ includes all of the commutation pulses (along with some noise pulses), whereas the signal $S_{DC}$ is representative of the average motor current. The high frequency signal $S_{AC}$ is applied to amplifier 34 which applies a gain factor of $a_1$, forming a signal on line 35 of $a_1*S_{AC}$, that is applied to the non-inverting input of comparator 36. Inverter 38 inverts the signal on line 35, forming a signal on line 39 of $-(a_1*S_{AC})$, that is applied to the inverting input of comparator 40. The low frequency signal $S_{DC}$ is applied to summer 42 along with a minimum threshold value $S_{MIN}$, and the sum ($S_{DC}$+$S_{MIN}$) is applied as an input to the amplifier 44, which applies a gain factor of $a_0$. The output of amplifier 44 on line 45 forms the commutation pulse threshold THR, and is given by $a_0*(S_{DC}+S_{MIN})$. The threshold THR is applied to the inverting input of comparator 36, and to the inverting input of comparator 40. Thus, the comparator 36 produces a high logic output signal when $a_1*S_{AC}>a_0*(S_{DC}+S_{MIN})$, corresponding to a positive commutation pulse; and the comparator 40 produces a high logic output signal when $-(a_1*S_{AC})>a_0*(S_{DC}+S_{MIN})$, corresponding to a negative commutation pulse. The outputs of comparators 36 and 40 are applied as inputs to OR-gate 46, which in turn, provides an input to one shot circuit 48. Thus, as indicated above, pulses of uniform duration (determined by one shot 48) are developed on line 26 for each commutation pulse detected in the signal $S_0$.

In the above described pulse detection circuit 18b, the minimum threshold $S_{MIN}$ and the gains $a_0$ and $a_1$ are calibrated for a given motor control application. The minimum threshold $S_{MIN}$ is calibrated to be equal to or slightly less than the minimum motor current required to overcome friction once the motor 10 is running; that is, the lowest motor current at which the motor 10 will seize for a given application. The gain $a_0$ applied to the sum ($S_{DC}+S_{MIN}$) is determined so that the threshold THR falls within the common mode input range of the comparators 36 and 40 over the entire range of $S_{DC}$. In this regard, a limiting circuit may optionally be inserted in the threshold generation path—i.e., between the filter 32 and summer 42, between the summer 42 and the amplifier 44, or after the amplifier 44—to define a maximum value of the threshold THR to simplify the design of the comparators. A moderate amount of limiting may be used without ill effect because susceptibility to noise occurs primarily at low values of $S_{DC}$. Finally, the gain $a_1$ applied to the high frequency component SAC is calibrated so that the minimum amplitude commutation pulse is approximately equal to the product $a_0*S_{DC}$. Typically, the minimum amplitude commutation pulse varies from 2%–10% of the average motor current, meaning that the gain $a_1$ will typically have a value of between $10*a_0$ and $50*a_0$.

FIG. 2 illustrates a motor control system 10' in accordance with a second embodiment of this invention in which a pulse detection circuit 18b' defines a threshold THR' that is switched between a high value and a low value depending on the mode of operation of the motor 10. Although this functionality can be implemented in different ways, FIG. 2 illustrates an embodiment in which a signal containing the commutation pulses is attenuated by a predetermined factor when the motor is running, and not attenuated otherwise. Alternatively, a simple logic circuit could be used to select the appropriate threshold for comparison with the commutation signal.

Referring to FIG. 2, the motor current signal on line 24 is applied to a band-pass filter and amplifier circuit 50 essentially equivalent to the combination of band-pass filter 30 and amplifier 34 of FIG. 1. The output of circuit 50 is applied through a resistor 52 to the junction 54, which is coupled to ground through a resistor 60 and the emitter-collector circuit of transistor 62. The base of transistor 62 is coupled to electronic controller 16 via line 64, which carries a logic one output signal when the motor 10 is in a run mode, and a logic zero when motor 10 is in a brake mode. The ratio of resistors 52 and 60 determines the amount of attenuation applied to the output of circuit 50 when transistor 62 is biased conductive during the motor run periods. In the illustrated embodiment, con the commutation pulse amplitude during running operation is approximately four times the commutation pulse amplitude during braking, so the resistance value of resistor 52 is chosen to be approximately three times that of resistor 60. Obviously, this ratio will vary depending on the application and motor. Similar to the embodiment of FIG. 1, the signal at junction 54 is applied to the non-inverting input of comparator 36. Inverter 38 inverts the signal at junction 54, and applies the inverted signal to the inverting input of comparator 40. A fixed threshold THR' is applied to the inverting input of comparator 36, and to the non-inverting inputs 7 comparators 36 and 40. The threshold THR' has a relatively low value, and is calibrated to be slightly less than the minimum amplitude commutation pulse expected during coasting of the motor 10. Thus, the comparator 36 produces a high logic output signal in response to a positive commutation pulse; and the comparator 40 produces a high logic output signal in response to a negative commutation pulse. The outputs of comparators 36 and 40 are applied as inputs to OR-gate 46, which in turn, provides an input to one shot circuit 48. In all other respects, the motor control system 10 of FIG. 2 is like that of FIG. 1, and therefore is not described in detail at this point.

In summary, the pulse detection circuits of the present invention may be characterized as having a variable threshold which is high when the commutation pulse amplitude is high, and low when the commutation pulse amplitude is low. According to the first embodiment of FIG. 1, the threshold is varied in accordance with the average current flowing through the motor at the time of the commutation event. According to a second embodiment of FIG. 2, the threshold is effectively switched between a high value and a low value depending on the mode of operation of the motor. In either case, the susceptibility to noise pulses is minimized without compromising the ability to reliably detect all commutation pulses.

It will be recognized that the present invention, while described in reference to the illustrated embodiments, is not limited thereto. For example, the motor current signal SO may be variously obtained, and numerous circuit modifications may be made. For example, the inverter 38 may be applied to the threshold instead of the motor current signal $S_O$, if desired, or an absolute value circuit could be used to eliminate one of the comparators 36, 40. Similarly, while the dual threshold function of the second embodiment is depicted as being achieved by selectively attenuation of the motor current signal $S_O$, it will be understood that alternate implementations may be utilized; for example, circuitry could be provided for selecting one of two different thresholds for comparison with an un-attenuated motor current signal $S_O$. Accordingly, it will be understood that pulse detection circuits incorporating these and other modifications may fall within the scope of this invention, which is defined by the appended claims.

What is claimed is:

1. Position feedback apparatus for a commutator-type DC motor, comprising:
    current measuring means for measuring a current through the motor;
    filter means for filtering the measured current to form a feedback signal including commutation pulses that vary in amplitude;
    comparison means for comparing the feedback signal to a threshold value to identify the commutation pulses as an indication of a change in motor position; and
    dynamic adjustment means responsive to an operating parameter of said motor that is related to an expected minimum amplitude of said commutation pulses for dynamically adjusting said feedback signal or said threshold value during operation of said motor so that said comparison means identifies all commutation pulses having an amplitude at least as great as said expected minimum amplitude.

2. The position feedback apparatus of claim 1, wherein said operating parameter is an average value of the motor current.

3. The position feedback apparatus of claim 2 wherein said dynamic adjustment means comprises:
    averaging means for measuring the average value of the motor current; and
    adjusting means responsive to said averaging means for adjusting said threshold value during operation of said motor in accordance with the measured average value.

4. The position feedback apparatus of claim 3, wherein said averaging means comprises:
    low pass filter means for low pass filtering said feedback signal to form said measured average value.

5. The position feedback apparatus of claim 3, wherein said adjusting means comprises:
    means for setting said threshold value according to a sum of said measured average value and a predefined value corresponding to a motor current at which said motor will seize due to friction.

6. The position feedback apparatus of claim 1, including a controller for activating said motor in either a run operating mode or a brake operating mode, and wherein said operating parameter is the activated operating mode of said motor.

7. The position feedback apparatus of claim 6, wherein the amplitude of said commutation pulses is higher in said run mode than in said brake mode, and wherein said dynamic adjustment means comprises:
    mode detection means for detecting the activated operating mode of said motor; and
    adjusting means responsive to said mode detection means for adjusting said feedback signal or said threshold value during operation of said motor based on the detected activated operating mode.

8. The position feedback apparatus of claim 7, wherein said adjusting means comprises:
    attenuation means for attenuating an amplitude of said feedback signal when the detected operating mode of said motor is said run mode, and not attenuating said amplitude when the detected operating mode of said motor is said brake mode.

9. A method of detecting a change in position of a commutator-type DC motor, comprising the steps of:
    measuring a current through the motor;
    filtering the measured current to form a feedback signal including commutation pulses that vary in amplitude;

comparing the feedback signal to a threshold value to identify the commutation pulses as an indication of a change in motor position;

detecting an operating parameter of said motor that is related to an expected minimum amplitude of said commutation pulses; and dynamically adjusting said feedback signal or said threshold value during operation of said motor in response to the detected operating parameter so that comparing the feedback signal to the threshold value will identify all commutation pulses having an amplitude at least as great as said expected minimum amplitude.

10. The method of claim 9, wherein said operating parameter is an average value of the current through the motor, and the method includes the steps of:

measuring an average value of the motor current; and dynamically adjusting said threshold value during operation of said motor in accordance with the measured average value.

11. The method of claim 10, wherein the step of measuring the average value of the motor current includes the step of:

low pass filtering said feedback signal.

12. The method of claim 10, wherein the step of dynamically adjusting the threshold value includes the steps of:

forming a sum of said measured average value and a predefined value corresponding to a motor current at which said motor will seize due to friction; and setting said threshold value in relation to said sum.

13. The method of claim 9, wherein said motor is activated in either a run operating mode or a brake operating mode, and wherein said operating parameter is the activated operating mode of said motor.

14. The method of claim 13, wherein the amplitude of said commutation pulses is higher in said run mode than in said brake mode, and the method includes the steps of:

detecting the activated operating mode of said motor; and dynamically adjusting said feedback signal or said threshold value during operation of said motor based on the detected activated operating mode.

15. The method of claim 14, wherein the step of dynamically adjusting the feedback signal includes the step of:

attenuating an amplitude of said feedback signal when the detected activated operating mode of said motor is said run mode, and not attenuating said amplitude when the detected activated operating mode of said motor is said brake mode.

* * * * *